United States Patent
Toksvig et al.

(10) Patent No.: US 10,192,494 B2
(45) Date of Patent: Jan. 29, 2019

(54) INDIVIDUAL CONTROL OF BACKLIGHT LIGHT-EMITTING DIODES

(71) Applicant: Facebook, Inc., Menlo Park, CA (US)

(72) Inventors: Michael John McKenzie Toksvig, Palo Alto, CA (US); Benoit M. Schillings, Los Altos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/597,646

(22) Filed: Jan. 15, 2015

(65) Prior Publication Data

US 2015/0130869 A1 May 14, 2015

Related U.S. Application Data

(63) Continuation of application No. 13/479,084, filed on May 23, 2012, now Pat. No. 8,976,105.

(51) Int. Cl.
*G09G 3/34* (2006.01)
*H04L 12/58* (2006.01)

(52) U.S. Cl.
CPC ........... *G09G 3/342* (2013.01); *G09G 3/3426* (2013.01); *G09G 2310/04* (2013.01); *G09G 2320/062* (2013.01); *G09G 2320/0626* (2013.01); *G09G 2320/0686* (2013.01); *G09G 2330/021* (2013.01); *G09G 2370/022* (2013.01); *H04L 51/32* (2013.01)

(58) Field of Classification Search
CPC ... G09G 2320/0626; G09G 2320/0686; G09G 2320/062; G09G 2330/021; G09G 2370/022; G09G 2310/04; G09G 3/342; G09G 3/3426; H04L 51/32
See application file for complete search history.

(56) References Cited

U.S. PATENT DOCUMENTS

| | | | | |
|---|---|---|---|---|
| 2010/0026724 A1* | 2/2010 | Goto | ......................... | G09G 3/20 345/690 |
| 2011/0014955 A1* | 1/2011 | Kim | .................. | G02F 1/133603 455/566 |
| 2011/0119258 A1* | 5/2011 | Forutanpour | ........ | G06Q 10/107 707/723 |

FOREIGN PATENT DOCUMENTS

GB    2461685 A  *  1/2010  .........  H04L 12/5865

* cited by examiner

*Primary Examiner* — Liliana Cerullo
(74) *Attorney, Agent, or Firm* — Baker Botts L.L.P.

(57) ABSTRACT

In one embodiment, a method includes, by software of a computing device, dynamically identifying a particular region of a display of the computing device. The method also includes, by the software and through a device driver of the computing device, dynamically adjusting one or more particular ones of a plurality of backlighting components of the display associated with the particular region.

17 Claims, 7 Drawing Sheets

INDIVIDUAL CONTROL OF BACKLIGHT LIGHT-EMITTING DIODES

PRIORITY

This application is a continuation under 35 U.S.C. § 120 of U.S. patent application Ser. No. 13/479,084, filed 23 May 2012.

TECHNICAL FIELD

This disclosure generally relates to displays.

BACKGROUND

A display often uses a backlight as a light source to provide a visible image on the display. A backlight can illuminate a display from the side or back of the display panel.

DESCRIPTION OF EXAMPLE EMBODIMENTS

Figure 1:
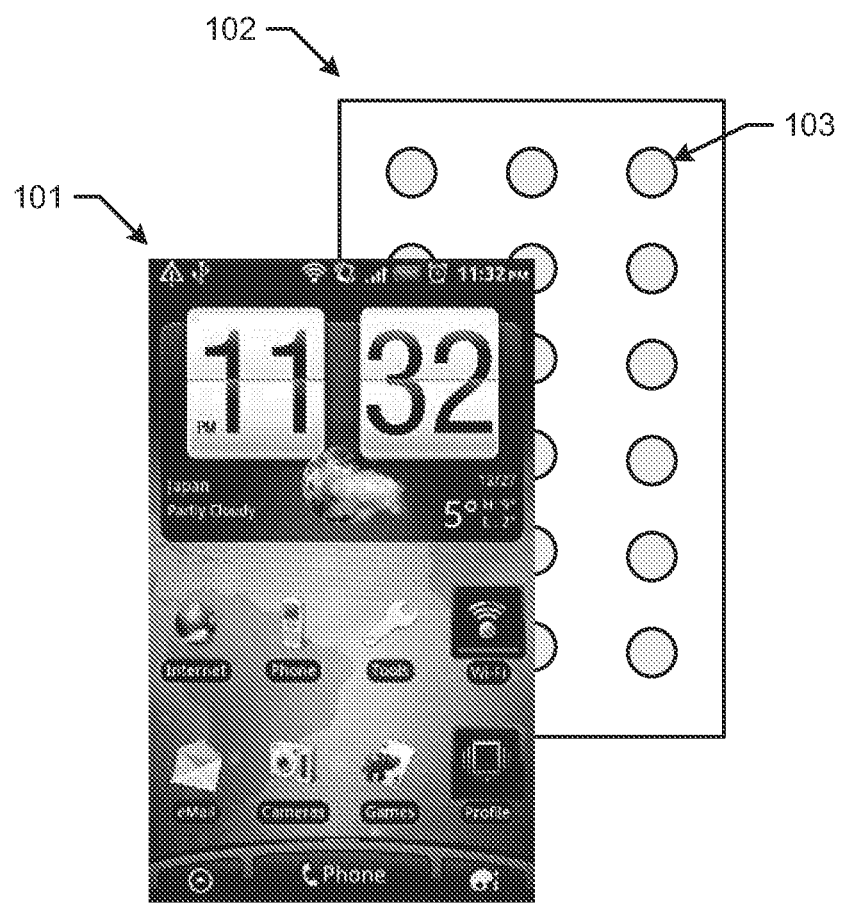
FIG. 1 illustrates an example display.

A display often uses a backlight as a light source to provide a visible image on the display. A backlight can illuminate a display from the side or back of the display panel. Displays such as liquid crystal displays (LCDs) often have internal built-in light sources for backlighting. FIG. 1 illustrates an example display. An example display of FIG. 1 may comprise screen 101 and backlight 102. Screen 101 may comprise one or more layers of components. For example, a touch screen of an LCD display may comprise liquid crystal layers for light modulation, one or more polarizing film layers for light filtering, and one or more layers of glass substrates with touch sensors. Backlight 102 may comprise one or more backlighting components 103. Backlighting components 103 may be disposed in an array structure, such as illustrated in FIG. 1. Backlighting components 103 may be disposed at the edge of a display. This disclosure contemplates any suitable arrangements for backlighting components of a display. Backlighting components 103 may comprise any suitable light source such as, for example, light-emitting diodes (LEDs), an electroluminescent panel, or cold cathode fluorescent, or any suitable combination of the forgoing. Backlighting components 103 may comprise light source of any suitable color. For example, backlight 102 of an LCD display may comprise an array of white LEDs. As for another example, backlight 102 of an LCD display may comprise an array of red/green/blue (RGB) LEDs. As yet for another example, backlight 102 of an LCD display may comprise an array of white LEDs, with a red LED adjacent to each white LED. As yet for another example, backlight 102 of an LCD display may comprise white LEDs disposed at the edge of the display.

Backlighting components of a display may be controlled individually or in groups for purposes of visual effects or power efficiency. Ordinarily, controlling backlighting components uses methods that analyze content of images being displayed in a display. For example, a computing device (e.g., a laptop computer, a smart phone) may display in its display an image (or a video) that has bright color in the upper half of the image and dark color in the lower half of the image (e.g., sun rising over a mountain). A graphical processing unit (or a central processing unit) of the device can analyze content of the image by inspecting frames being sent to the display. The graphical processing unit can determine that the lower half of the display does not need strong backlighting, and decrease light intensity by approximately 50% for backlighting components corresponding to the lower half of the display. However, adjusting backlight of a display by analyzing content of images being displayed may not be efficient as the analyzing content of images itself consumes energy.

Figure 2:
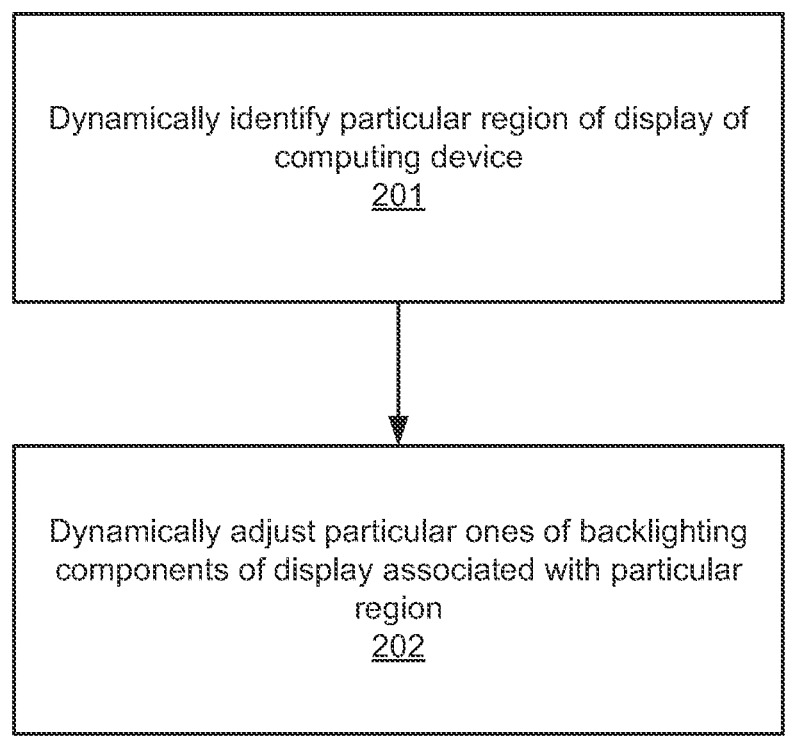
FIG. 2 illustrates an example method for individual control of backlighting components for partial display.
Figure 3:
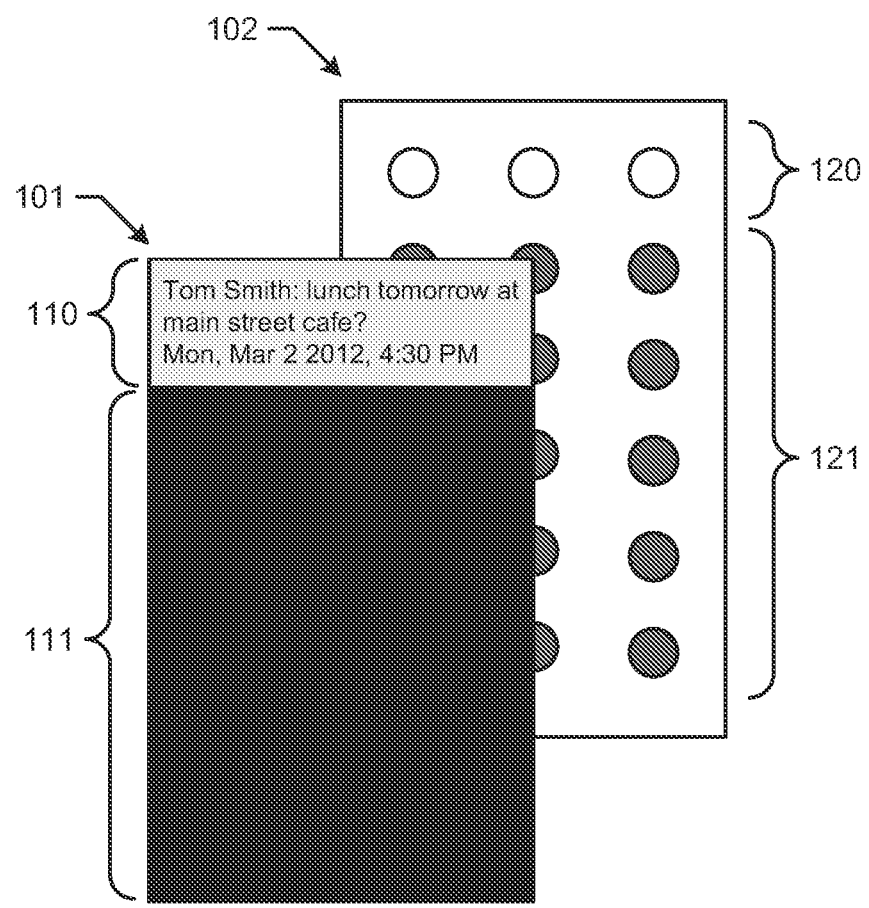
FIG. 3 illustrates another example display.

Instead of analyzing content of images being displayed at a display, particular embodiments may dynamically determine backlighting requirement for one or more regions of the display before images a displayed. FIG. 2 illustrates an example method for individual control of backlighting components for partial display. In particular embodiments, a display of a computing device may comprise a plurality of backlighting components. The computing device may be a laptop computer, a tablet computer, an in- or out-of-car navigation system, a handheld game console, an electronic book reader, a mobile phone, a television set, or any other suitable computing device, or combination of such devices. In particular embodiments, the plurality of backlighting components may be LEDs. In particular embodiments, the plurality of backlighting components may be of any suitable colors. In particular embodiments, software (e.g., an application or an operating system) hosted by the computing device may dynamically identify a particular region of the display of the computing device (STEP 201). FIG. 3 illustrates another example display of a mobile phone. For example, the software can be a messaging application of the mobile phone. The messaging application may receive a Short Message Service (SMS) message through the mobile phone's communication interface. The messaging application may identify the very top portion (110) of the mobile phone's display (101) for displaying the message, as illustrated in FIG. 3. In particular embodiments, the software may dynamically adjust one or more particular ones of the plurality of backlighting components of the display associated with the particular region (STEP 202). The software may dynamically adjust the particular ones of the backlighting components by accessing an application programming interface (API) to cause a device driver of the plurality of backlighting components to adjust the particular ones of backlighting components. For example, the messaging application can dynamically adjust (e.g., by accessing an API) the backlighting components 120 for the very top portion 110 of the mobile phone's display as illustrated in FIG. 3. For example, the messaging application may adjust the backlighting components 120 to approximately 100% light intensity. For example, the messaging application may adjust the backlighting components 120 to approximately 50% light intensity if the messaging application determines (e.g., by accessing a system clock of the mobile phone) that the current time is close to midnight. For example, the messaging application may adjust the backlighting components 120 to approximately 50% light intensity if the messaging application determines (e.g., by accessing a light sensor of the mobile phone) that the ambient lighting is dim (or dark). For example, the messaging application may adjust the backlighting components 120 to approximately 50% light intensify if the messaging application determines (e.g., by accessing a device driver of the mobile phone's battery) that the mobile phone's remaining battery life is low (e.g., below 15% of the battery's full capacity). For example, the messaging application may adjust the backlighting components 120 (or select a subset of the backlighting components 120) to emit only red light (or any other suitable particular color light) if the messaging application determines that the ambient lighting is dim (or dark). For example, if the messaging application determines that its user interface is in a single color (e.g., red), the messaging application may adjust the backlighting components 120 (or select a subset of the backlighting components 120) to emit only the single color. That is, the messaging application may reduce power consumption of the mobile device's display by adjusting backlighting components 120 to emit the most efficient color of backlighting components 120, or only the color that may not be filtered (e.g., by the display's polarizing films). Since the messaging application only display the SMS message at the very top portion 110 of the mobile phone's display, the messaging application may identify another area 111 corresponding to the rest of the mobile phone's display, as illustrated in FIG. 3. The messaging application may dynamically adjust backlighting components 121 corresponding to the area 111. For example, the messaging application may turn off (e.g., by accessing an API) backlight components 121 to conserve energy. Furthermore, the messaging application may instruct a device driver of the mobile phone's display to refresh only for the very top portion 110 of the display.

Particular embodiments may repeat the steps of the method of FIG. 2, where appropriate. Moreover, although this disclosure describes and illustrates particular steps of the method of FIG. 2 as occurring in a particular order, this disclosure contemplates any suitable steps of the method of FIG. 2 occurring in any suitable order. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

The example method of FIG. 2 can be implemented for any suitable software of a computing device to identify any suitable particular region of the computing device's display and adjust backlighting components accordingly. For example, a navigation application of a mobile device (e.g., a mobile phone, a tablet computer) may display a navigation map in the whole screen of the mobile device's display. The navigation application may determine (e.g., by accessing a light sensor of the mobile device) that the ambient lighting is dim, and dynamically adjust backlighting components of the mobile device's display to emit red light only. As for another example, a stand-by application of a television set may display a clock at the lower right corner of the television set's display when the television set is in stand-by mode. The stand-by application may dynamically turn on backlighting components corresponding to the lower-right corner of the display, while turning off rest of the backlighting components of the display. An operating system of a computing device may identify one or more regions of the computing device's display and adjust backlighting components accordingly. For example, the operating system may display a system alert (e.g., a message indicating low battery or dropped network connection) at the top one-third of the display. The operating system may dynamically turn on backlighting components corresponding to the top one-third of the display, while turning off backlighting components corresponding to the rest of the display. In some embodiments, backlighting control by the operating system may take precedence over backlighting control requests from applications running on the computing device.

A web browser or a special-purpose application (e.g., Facebook for Mobile provided by Facebook, Inc. of Menlo Park, Calif.) hosted by a computing device (e.g., a desktop computer, a laptop computer, a tablet computer, or a mobile phone) may present in its user interface a structured document (e.g., a web page) in a display of the computing device. The structure document may contain static content such as articles, emails, or pictures. The structure document may also contain dynamic content such as streaming videos or animations. Another example of dynamic content of a structured document is Facebook Ticker provided by Facebook, Inc. of Menlo Park, Calif. Facebook Ticker presents substantially real-time content such as news update and online chat in a box or an iframe within a Facebook web page. The special-purpose application (or the web browser) may adjust backlighting of the display based on the static and dynamic content of the structured document. For example, the special-purpose application may determine that a viewer of the structured document has been idle (e.g., no user input event such as mouse click or mouse hovering) for a specified time (e.g., 3 minutes). The special-purpose application may identify in its user interface one or more regions for static content of the structured document. The special-purpose application may dynamically turn off one or more backlighting components (of the display) corresponding to the one or more regions for static content of the structured document. That is, the special-purpose application may dim off static content of the structured document (by turning off corresponding backlighting components) if there is no user input activity, while maintaining displaying dynamic content of the structured document. In one embodiment, the special-purpose application (or the web browser) may adjust backlighting of the display based on the importance of content of the structured document. For example, the special-purpose application may identify in its user interface one or more regions with high importance. The one or more regions with high importance may correspond to dynamic content of the structured document. The one or more regions with high importance may correspond to a frame that the viewer has last interacted with (e.g., an email message that the viewer was composing). The special-purpose application may maintain backlighting for the one or more regions with high importance, and turn off backlighting components (of the display) corresponding to rest of the structured document.

In particular embodiments, a messaging application (or any other suitable application) of a computing device may dynamically adjust (e.g., by accessing an API) backlighting components of the computing device's display based on the messages and notifications it receives. For example, the message application may receive a message and determine (e.g., by inspecting the sender or content of the message) the message is an advertisement from a trusted or paid advertiser. The messaging application may display the advertising message in the top portion of the computing device's display. Meanwhile, the messaging application may highlight the advertising message by dynamically turning on backlighting components corresponding to the top portion of the display, and turning off backlighting components corresponding to the rest of the display. As for another example, the message may receive a message and determine a location associated with the message (e.g., by accessing an address book stored in the computing device for the message sender's address). The messaging application may determine the computing device's location (e.g., by accessing the computing device's Global Positioning System sensor or a mapping application). If the message's location and the computing device's location is within a preset distance (e.g., within 2 miles), the messaging application may display the message in the middle one-third portion of the computing device's display. Meanwhile, the messaging application may highlight the message by dynamically turning on backlighting components corresponding to the middle one-third portion of the display, and turning off backlighting components corresponding to the rest of the display.

As for another example, the messaging application may receive a message and determine an affinity score between a user of the computing device and a sender of the message. An affinity score may be 1.0 if the sender is the user's immediate family members (e.g., parents, siblings). An affinity score may be 0.9 if the sender frequently communicates with the user. An affinity score may be 0.7 if the sender is the user's first-degree social contact in a social graph of a social networking system. Interaction between users on a social networking system, such as chats, wall posts, emails, and the like, can also be used in scoring affinities between users of the social networking system. Methods of measuring affinity scoring are described later. The message may include an affinity score determined by a server transmitting the message to the computing device. The messaging application may also access locally stored affinity scores to determine an affinity score for the message. The messaging application may also determine an affinity score for the message by accessing an address book (e.g., stored on the computing device) and determine the relationship between the user and the sender. The messaging application may display the message in the top portion of the computing device's display, if the message's affinity score is high (e.g., above a preset threshold). Meanwhile, the messaging application may highlight the high-affinity message by dynamically turning on backlighting components corresponding to the top portion of the display, and turning off backlighting components corresponding to the rest of the display.

Message Affinity Scoring

In one embodiment, a process running in a social networking environment requests a measure of affinity for a particular user from a module that implements an affinity function. The module, in one implementation, computes the requested measure of affinity by combining (e.g., adding) a weighted set of predictor functions, where each predictor function predicts whether the user will perform a different action. The weights may be provided by the process that requests the measure of affinity, which allows the requesting process to weight the predictor functions differently. In this sense, the affinity function is tunable by the requesting process for its own purpose. In one implementation, affinities may be computed for the purposes of computing an affinity score of an outgoing message to an intended recipient.

The predictor functions may predict whether a user will perform a particular action based on the user's interest in the action. For example, a predictor function may be derived based on a user's historical activity (such as interacting with other users utilizing the social networking system functionality discussed above, for example). Additionally, the predictor function may include a decay factor that causes the strength of the signal provided by the user's historical activity to decay with time. The predictor functions may predict any number of actions, which may be within or outside of the social networking system. For example, these actions may include various types of a user's communications, such as messages, posting of content, and commenting on content; various types of a user's observation actions, such as viewing profiles of other connections and viewing photos and content posted by other connections; and various types of coincidence information about two or more users, such as being tagged in the same photograph, checked in at the same location, and attending the same event. A predictor function may be determined using a machine learning algorithms trained on historical activity and past user responses or data farmed from users by exposing them to various options and measuring responses.

To predict the likely actions a user may take in a given situation, any process on the social networking system or outside may request a measure of affinity for a user by providing a set of weights. The measure of affinity may reflect the user's interest in other users, content, actions, advertisements, or any other objects in the social networking system. The weights may be binary or, more generally, any real number. In one implementation, messages intended for a communications device of a subject user that are transmitted or intermediated by the social networking system, for example, may be processed to compute an affinity between the subject user and the message. The affinity value can be appended to the message prior to transmission to the communications device. In other implementations, a process hosted on the communications device may access the affinity module to request the measure of affinity. In some implementations, the communications device may request affinities between the subject user of the communications device and one or more other users identified in a contacts database of the subject user (stored locally on the communications device or remotely on the social networking system). Revised affinity values can be obtained during subsequent synchronization processes. Communications device may use these affinity values for messages from the respective users. In other implementations, the communications device may monitor interactions locally and compute affinity values locally.

Figure 4:
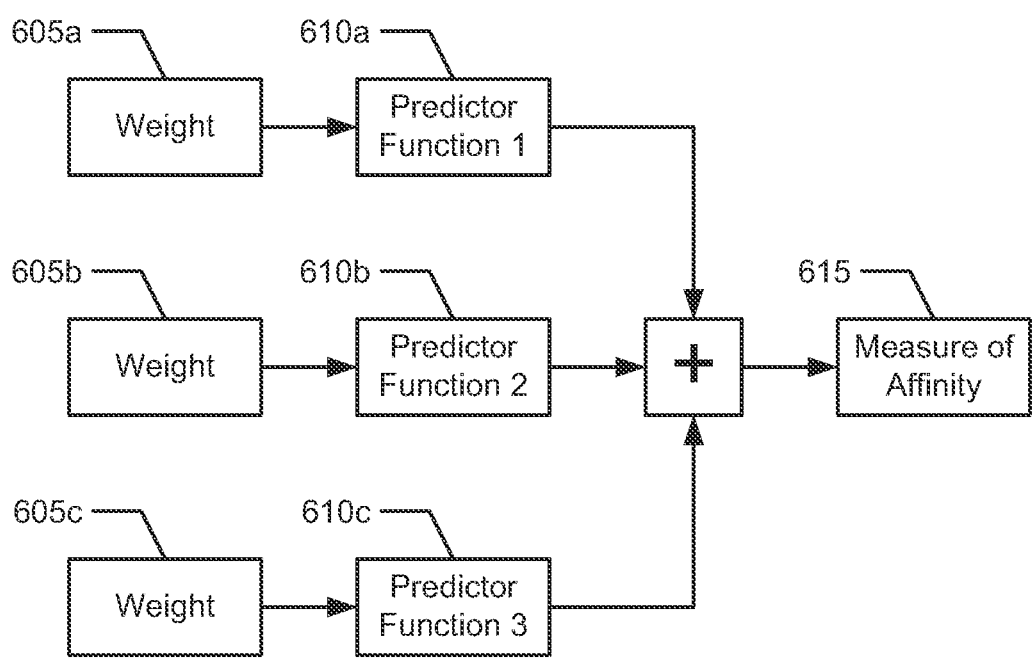
FIG. 4 illustrates an example block diagram for computing a measure of affinity for users in a social networking system.

FIG. 4 is a block diagram of a function for computing a measure of affinity for users in a social networking system. To compute a measure of affinity 615 that indicates a set of likely actions a user may want to take in any given situation, weights 605 are applied to predictor functions 610 and then combined to obtain a measure of affinity 615. Although FIG. 4 shows three predictor functions 610, any number of predictor functions can be employed in other embodiments of the invention. Additionally, in the embodiment of FIG. 4, the weighted predictor functions 610 are combined linearly. In different embodiments, other forms of combination may be used, including harmonic means, mean squares, and geometric means. Additionally, multiple measures of affinity 615 with varying weights 605 may be computed before predicting a user's actions.

The weights 605 of the affinity function enable it to be used by various processes in the social networking system environment for different purposes. For example, in a process that provides advertisements with social endorsements from a viewer's friends, an ad algorithm may use the measure of affinity 615 function to determine which of a user's connections to mention in the social endorsement or what type of actions to mention in the endorsement. The measure of affinity 615 may then be based on those predictor functions 610 that show how interested the user is in viewing the content posted by another user as well as one or more predictor functions 610 that show how interested the user is in various actions that may be mentioned in the social endorsement. The ad algorithm would thus provide relatively large weights for these predictor functions 610 so that the resulting measure of affinity would more accurately determine which social endorsements would be more interesting to the viewing user. The ad algorithm would then select the social endorsement using the resulting measure of affinity, thereby increasing the likelihood of conversion of the advertisement.

As a second example, in a process for a messaging application that intermediates communications between users, a social algorithm may use the measure of affinity 615 function to determine what level of interest a user may have in a message sent by a particular sending user. The measure of affinity 615 for this purpose may be based on predictor functions 610 that show how interested the user is in viewing the content posted by the user's connections and/or how often the users send messages to one another in general, as well as one or more predictor functions 610 that show how interested the user is posting or accessing different types of messages. Accordingly, the social algorithm would weight these predictor functions 610 relatively high so that the resulting measure of affinity would accurately determine which messages would be more interesting to the viewing user. Because of the highly tunable nature of the affinity function, enabled by the weighted predictor functions 610, it can be used for a number of different purposes.

Figure 5:
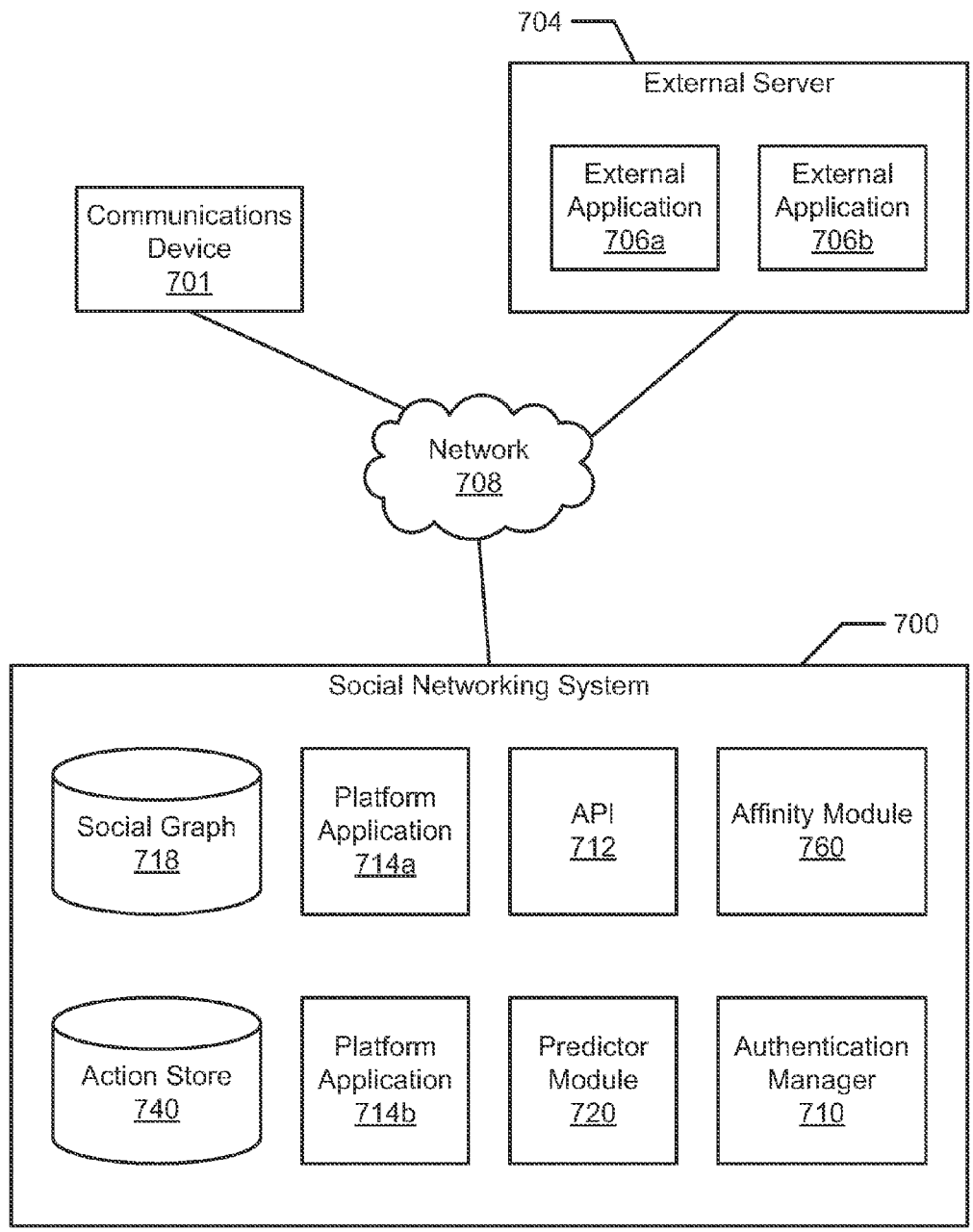
FIG. 5 illustrates an example social networking environment.

FIG. 5 is a high-level block diagram of an environment of a social networking system, according to one embodiment. FIG. 5 illustrates a social networking system 700, a user device 702, and an external server 704 connected by a network 708. The social graph 718 stores the connections that each user has with other users of the social networking system 100. The social graph 718 may also store second-order connections, in some embodiments. The connections may thus be direct or indirect. For example, if user A is a first-order connection of user B but not of user C, and B is a first-order connection of C, then C is a second-order connection of A on the social graph 718.

The action store 740 stores actions that have been performed by the users of the social networking system 700, along with an indication of the time associated with those actions and references to any objects related to the actions. Additionally, the action store 740 may store statistics for specified categories of actions. For example, for a given user the action store 740 may contain the number of wall posts in 30 days by a user, messages sent by the user, number of photos posted by the user in 30 days and number of distinct users that received the user's comments in 30 days. For a given connection between two users, user A and user B, the action store 740 may contain actions such as the number of profile page views from A to B, the number of photo page views from A to B, the number of messages from A to B, and the number of times A and B were tagged in the same photo, and these actions may be associated with a timestamp or may be filtered by a cutoff (e.g., 24 hours, 90 days, etc.). The actions recorded in the action store 740 may be farmed actions, which are performed by a user in response to the social networking system 700 providing suggested choices of actions to the user.

The predictor module 720 is responsible for computing a set predictor functions 610, which predict whether a user will perform a set of corresponding actions. As discussed above, each predictor function 610 may be representative of a user's interest in a particular action associated with the predictor function 610. The historical activity of a user may be used as a signal of a user's future interest in the same activity. In some embodiments, the predictor function 610 is generated using a machine learned algorithm that is trained using a user's historical activity associated with an action. The predictor module 720 thus provides a predictor function 610 for each of a set of actions, where a predictor function 610 may take as an input the a user's historical activity and then outputs a measure of the likelihood that the user will engage in the corresponding activity.

In some embodiments, one or more of the predictor functions 610 may use a decay factor in which the strength of the signal from a user's historical activity decays with time. Moreover, different predictor functions 610 may decay the historical activity at different rates. For example, some types of user activity, like adding a new connection, indicate a more persistent interest than other types of activity that indicate a more ephemeral interest, like commenting on another user's status. Therefore, the predictor functions 610 may decay the effect of historical activity based on an understanding about how that activity may become less relevant over the passage of time. Various decay mechanisms may be used for this purpose. For example, a predictor function 610 may use a mathematical function, such as an exponential decay, to decay the statistics about a user behavior. In another embodiment, the decay is implemented by selecting only those statistics about a user behavior that occurred within a specific window of time, such as 24 hours or 30 days.

In one embodiment, a predictor function 610 is realized as a ratio of two affine functions as shown in equation (1). The numerator and denominator affine functions take statistics of the user's historical activity as inputs.

$$P = \frac{a_0 + a_1 x_1 + a_2 x_2 + \ldots + a_n x_n}{b_0 + b_1 x_{n+1} + \ldots + b_m x_{n+m}} \quad (1)$$

where
P is the predictor function 610;
$a_i$ for i=0, 1, 2, ..., N are the coefficients in the numerator affine function;
$b_i$ for i=0, 1, 2, ..., M are the coefficients in the denominator affine function; and
$x_i$ for i=1, 2, ..., N+M are the statistics on a user's historical activity related to the predictor function P.

The denominator affine function can represent a normalization of the numerator affine function. For example, the number of comments made by a user may be normalized by, among other statistics, the number of times the user has been active on the social networking system 700. In particular, by altering $b_i$ for i=0, 1, 2, ..., M the normalization pattern can be changed. In some embodiments, some or all of the coefficients, $a_i$ for i=0, 1, 2, ..., N and $b_i$ for i=0, 1, 2, ..., M, are determined through machine learning, which may be implemented by the predictor module 720. In a particular embodiment, a supervised machine learning algorithm is used with the training data obtained through farming, by providing a statistically significant number of users several options and monitoring their response. In another embodiment, the supervised machine learning algorithm is trained entirely based on historical user activity and past responses to choices of actions. The predictor functions 610 may also be non-linear. An example embodiment implements a predictor function 610 for a family where the predictor function 610 includes an 'if-then' construct for the members of the family—i.e., the predictor function 610 is computed differently depending on whether it is being computed for the parents or the children.

Some predictor functions 610 in the social networking system 700 may predict actions related to a user's communication in the social networking system 700. The statistics specifically related to communications may include broadcast data and communication data. Broadcast data may include, for example, the number of photos posted by the user in a given time period, the number of posts via applications by the user in a given time period, and any other communication that the user has posted or otherwise distributed to a group of other users. Communication data may include, for example, the number of likes from the user in a given time period, number of comments posted by user in a given time period, and any other information about the user's communication activities.

Similarly, some predictor functions 610 in the social networking system 700 may predict actions related to a user's observation of content in the social networking system 700. The statistics specifically related to observation may include, for example, the number of profile page views by the user of another user in a given time period, the number of photo views by the user in a given time period, the number of views of an advertisement containing a social endorsement in a given time period, and any other activity involving the viewing of content by the user.

Finally, some predictor functions 610 in the social networking system 700 may predict actions related to a user's coincidence with one or more other users of the social networking system. The statistics specifically related to coincidence may include, for example, a rate at which two or more users have been tagged in the same photograph, have checked in at the same location, or have confirmed (e.g., via RSVP) that they will be attending the same event, and any other activity involving an action or object in the social networking system related to multiple users.

The affinity module 760 provides a measure of affinity 615 based on input data about the user from the social networking system 700 using the predictor functions 610. In the embodiment of FIG. 5, the affinity module 760 sums the predictor functions linearly as shown in equation (2). However, other implementations are equally feasible.

$$A=\beta_0+\beta_1P_1+\beta_2P_2+\ldots+\beta_sP_s \quad (2)$$

where
A is the measure of affinity 615 requested;
$P_i$ for i=0, 1, 2, ..., s are the s predictor functions 610 in the social networking system 700; and
$\beta_i$ for i=1, 2, ..., s are the weights 605 assigned to the s predictor functions 610 in the social networking system 100.

Figure 6:
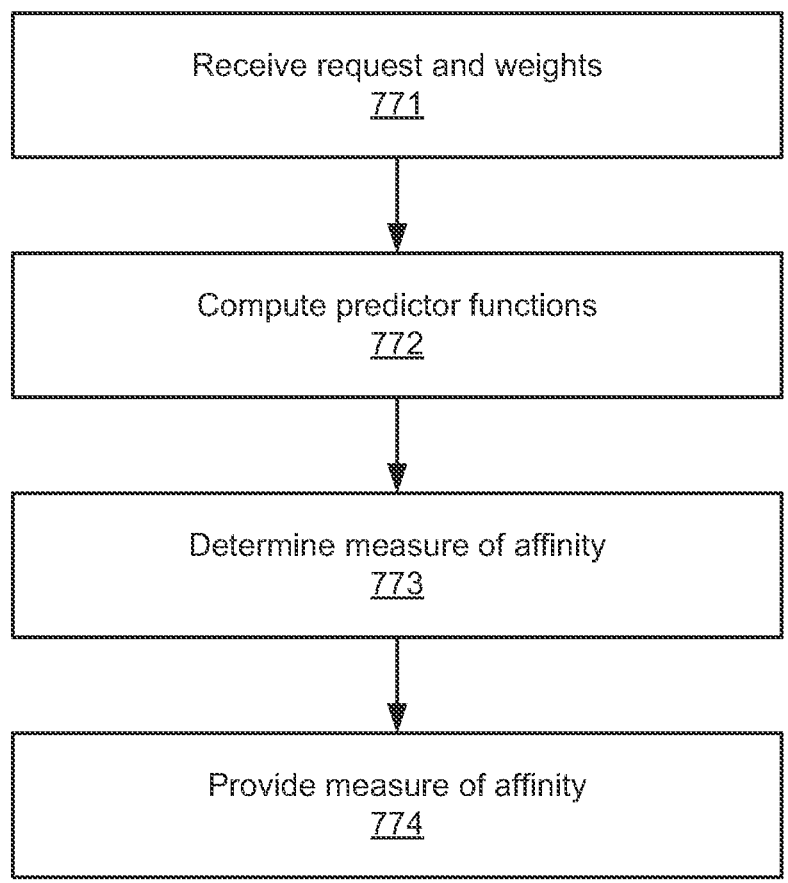
FIG. 6 illustrates an example method for computing a measure of affinity for a user based on a request.

FIG. 6 illustrates an embodiment of a method for computing a measure of affinity 615 for a user based on a request. The social networking system 700 first receives a request from a process for a measure of affinity 615 for a user along with the weights 605 to be assigned to the various predictor functions 610 (STEP 771). The request may include the message for which an affinity score is desired or one or more attributes extracted from the message. The social networking system 700 then computes the predictor functions 610 for the user in the predictor module 760 (STEP 772). The predictor functions 610 previously computed are combined to determine an overall measure of affinity 615 (STEP 773), which is then provided to the requesting process (STEP 774).

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
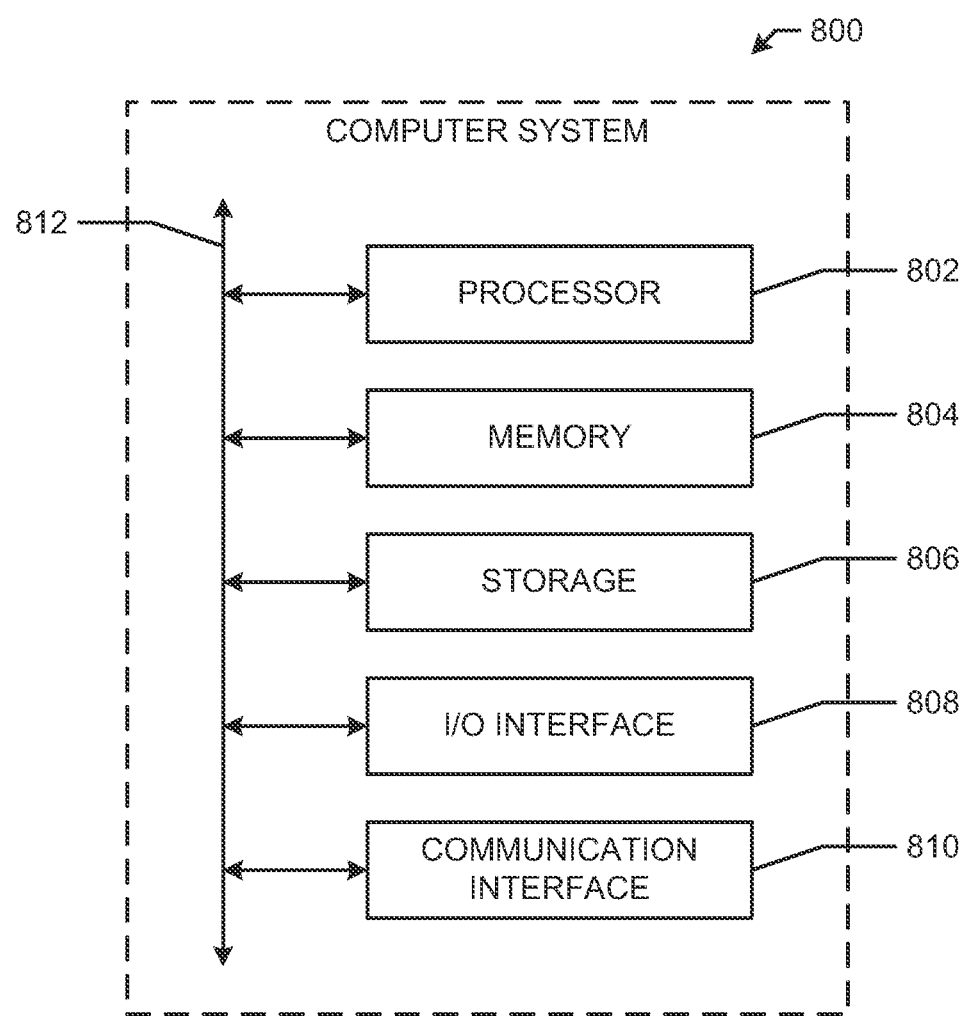
FIG. 7 illustrates an example computer system.

FIG. 7 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, reference to a computer-readable storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, or any other suitable computer-readable storage medium or media), or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device of a user, dynamically identifying a first subregion and a second subregion of a display of the computing device, wherein the display is backlit by backlighting components, and wherein content of a structured document is associated with each subregion;

by the computing device, receiving a message, the message being associated with a messaging application running on the computing device of the user;

by the computing device, in response to receipt of the message, computing an affinity score between a source of the message and the user, the affinity score being computed based at least in part on interactions on a social-networking system between the source of the message and the user;

by the computing device, increasing light intensity of one or more backlighting components to emit a particular color light that backlight the first subregion comprising the message based on:
- the content associated with the first subregion, wherein the content associated with the first subregion comprises the message received at the computing device,
- the computed affinity score being above a preset threshold, and
- a color associated with the user interface of the messaging application, wherein the particular color light is substantially the same as the color associated with the user interface; and by the computing device, decreasing light intensity of one or more backlighting components that backlight the second subregion based on the content associated with the second subregion, wherein the increasing and the decreasing are concurrent.

2. The method of claim 1, further comprising determining that no user input has been received by the computing device for a predetermined period of time, wherein the first subregion and the second subregion are dynamically identified in response to the determination that no user input has been received.

3. The method of claim 1, wherein the content associated with the first subregion comprises dynamic content of the structured document, and wherein the content associated with the second subregion comprises static content of the structured document.

4. The method of claim 1, further comprising determining a first location of a source of the message, wherein the increasing the light intensity is based on the first location being less than a predetermined distance from a second location of a user of the computing device.

5. The method of claim 1, wherein the first subregion and the second subregion are dynamically identified based on importance of the content associated with the respective subregion.

6. The method of claim 1, further comprising maintaining the light intensity of one or more backlighting components that backlight the first subregion based on the content associated with the first subregion.

7. The method of claim 1, wherein the decreasing the light intensity comprises turning off the one or more backlighting components that backlight the second subregion.

8. One or more computer-readable non-transitory storage media embodying software that is operable when executed to:
dynamically identify a first subregion and a second subregion of a display of a computing device of a user, wherein the display is backlit by backlighting components, and wherein content of a structured document is associated with each subregion;

receive a message, the message being associated with a messaging application running on the computing device of the user;

compute, in response to receipt of the message, an affinity score between a source of the message and the user, the affinity score being computed based at least in part on interactions on a social-networking system between the source of the message and the user;

increase light intensity of one or more backlighting components to emit a particular color light that backlight the first subregion comprising the message based on:
- the content associated with the first subregion, wherein the content associated with the first subregion comprises the message received at the computing device,
- the computed affinity score being above a preset threshold, and
- a color associated with the user interface of the messaging application, wherein the particular color light is substantially the same as the color associated with the user interface; and decrease light intensity of one or more backlighting components that backlight the second subregion based on the content associated with the second subregion, wherein the increasing and the decreasing are concurrent.

9. The media of claim 8, further comprising determining that no user input has been received by the computing device for a predetermined period of time, wherein the first subregion and the second subregion are dynamically identified in response to the determination that no user input has been received.

10. The media of claim 8, wherein the content associated with the first subregion comprises dynamic content of the structured document, and wherein the content associated with the second subregion comprises static content of the structured document.

11. The media of claim 8, further comprising determining a first location of a source of the message, wherein the increasing the light intensity is based on the first location being less than a predetermined distance from a second location of a user of the computing device.

12. The media of claim 8, wherein the first subregion and the second subregion are dynamically identified based on importance of the content associated with the respective subregion.

13. The media of claim 8, further comprising maintaining the light intensity of one or more backlighting components that backlight the first subregion based on the content associated with the first subregion.

14. A system comprising: one or more processors; and a memory coupled to the processors comprising instructions executable by the processors, the processors operable when executing the instructions to:
dynamically identify a first subregion and a second subregion of a display of a computing device of a user, wherein the display is backlit by backlighting components, and wherein content of a structured document is associated with each subregion;

receive a message, the message being associated with a messaging application running on the computing device of the user;

compute, in response to receipt of the message, an affinity score between a source of the message and the user, the affinity score being computed based at least in part on interactions on a social-networking system between the source of the message and the user;

increase light intensity of one or more backlighting components to emit a particular color light that backlight the first subregion comprising the message based on:
the content associated with the first subregion, wherein the content associated with the first subregion comprises the message received at the computing device,
the computed affinity score being above a preset threshold, and
a color associated with the user interface of the messaging application, wherein the particular color is substantially the same as the color associated with the user interface; and
decrease light intensity of one or more backlighting components that backlight the second subregion based on the content associated with the second subregion, wherein the increasing and the decreasing are concurrent.

15. The system of claim 14, further comprising determining that no user input has been received by the computing device for a predetermined period of time, wherein the first subregion and the second subregion are dynamically identified in response to the determination that no user input has been received.

16. The system of claim 14, further comprising determining a first location of a source of the message, wherein the increasing the light intensity is based on the first location being less than a predetermined distance from a second location of a user of the computing device.

17. The system of claim 14, wherein the first subregion and the second subregion are dynamically identified based on importance of the content associated with the respective subregion.

* * * * *